United States Patent [19]
Hatch

[11] Patent Number: 5,031,061
[45] Date of Patent: Jul. 9, 1991

[54] DISK DRIVE HUB ASSEMBLY

[75] Inventor: Michael R. Hatch, Palo Alto, Calif.

[73] Assignee: Quantum Corporation, San Mateo, Calif.

[21] Appl. No.: 413,468

[22] Filed: Sep. 27, 1989

[51] Int. Cl.⁵ .............................................. G11B 17/14
[52] U.S. Cl. ............................ 360/98.07; 360/98.08; 360/99.08
[58] Field of Search ............... 360/98.07, 98.01, 98.02, 360/98.08, 99.04, 99.05, 99.12

[56] References Cited

U.S. PATENT DOCUMENTS

| | | | |
|---|---|---|---|
| 4,672,488 | 6/1987 | Wright | 360/98.08 |
| 4,764,828 | 8/1988 | Gollbach | 360/98.08 |
| 4,910,620 | 3/1990 | Olbrich | 360/98.08 |

FOREIGN PATENT DOCUMENTS 0193156 10/1985 Japan .................................. 360/98.02

*Primary Examiner*—David J. Severin
*Attorney, Agent, or Firm*—David B. Harrison

[57] ABSTRACT

A disk drive spindle assembly including a rotatable hub and one or more disks having a central opening slightly larger than the cross dimension of the hub, so that the disk may freely fit over the hub. A flange extends radially outwardly from a lower region of the hub and defines an narrow, vertically extending annular support wall for supporting a disk along a uniform narrow contact region between the hub and the disk. A disk clamp clamps the disk against the support wall contact region. An annular concentric space, preferably defined by an elastomeric spacer structure which aligns the disk relative to an axis of rotation of the hub, spaces the disk away from the hub.

6 Claims, 3 Drawing Sheets

DISK DRIVE HUB ASSEMBLY

FIELD OF THE INVENTION

The present invention relates to a disk drive hub assembly for mounting storage disks for rotation upon a spindle assembly. The invention finds special application within disk drives having an in-the-hub spindle motor and one or more rigid disks which are directly clamped to a hub of the disk spindle assembly.

BACKGROUND OF THE INVENTION

Disk drives employing a spindle assembly for rotatably mounting rigid data storage disks relative to a base or frame of the disk drive are known in the art. A disk spindle assembly includes a vertical spindle hub which is journalled by bearings to the base or frame so as to be rotatable relatively thereto. Typically, a flange extends radially outwardly from the hub at a bottom region thereof. A rigid storage disk of the type presently under contemplation is typically formed of sheet metal such as aluminum alloy which is provided with a magnetic storage media formed on the two major surfaces thereof. A central opening enables the disk to fit coaxially over the spindle hub. A single data storage disk may be used in the disk drive; or, multiple data storage disks may be provided in a stacked, spaced apart relationship. Rigid annular spacers are used to space the disks apart. A top clamp is typically provided to clamp the disk stack including the disks and spacers downwardly upon the outwardly extending radial flange of the hub.

The function of the spindle assembly is to provide two interfaces with the storage disk(s): an axial interface for fixing the disk in space vertically along the longitudinal axis of rotation of the hub, and a radial interface for fixing the disk concentrically with the axis of rotation. To provide effectively these two interfaces the spindle assembly must clamp the disk in axial position and must clamp the disk in radial position with sufficient clamping force that the disk remains properly positioned throughout the useful life of the disk drive.

The spindle assembly is rotated by a motor so that a relatively stationary, yet positionable head may "fly" upon an air bearing formed at the data storage surface of each data storage disk disk in order to carry out data transfer operations relative to multiple concentric data tracks formed thereon. The spindle motor may be external to the spindle assembly and transfer rotational energy by a belt or other driving arrangement. The motor may be directly coupled to the spindle, yet external to it. More frequently today, the motor may be formed entirely within the spindle; and when it is, certain problems relating the the mounting of the disk stack upon the spindle assembly arise.

Since an in-the-hub spindle motor generates heat as it generates and imparts rotational force to the disk spindle, the heat causes the spindle assembly to expand according to the coefficient of expansion of the various materials from which the spindle assembly is formed. The hub tends to expand radially outwardly with heat, and this outward expansion may cause the disks to slide within the clamped stack (radial displacement), or to become warped (axial displacement). Disk slippage leads to eccentricity of data storage tracks and potential loss of data. Warpage leads to disks being out of flatness and potential catastrophic interference between the flying head and the disk surface. Within a disk stack of four disks, for example, the upper and lower disks may experience both axial and radial displacements, whereas the middle disks and spacers between the disks tend to experience radial displacement only.

Also, an in-the-hub spindle motor typically requires that a magnetic return path be provided. Such a path is typically provided by a magnetic flux carrying material, such as low carbon steel. The coefficient of thermal expansion of an aluminum alloy storage disk is typically approximately 13 microinches per degree Fahrenheit. The coefficient of thermal expansion of low carbon steel is approximately 6.5 microinches per degree Fahrenheit. A hub assembly formed as a composite of an aluminum alloy casting and a low carbon steel flux return insert has an overall coefficient of thermal expansion of about 9 microinches per degree Fahrenheit.

During operation of the disk drive, changes in temperature within the drive cause expansion and contraction of the disks and of the spindle assembly including the hub. The differences in thermal expansion coefficients will result in more expansion and contraction of the aluminum alloy disk than of a composite aluminum-/steel hub assembly. As already noted, the position of the disk relative to center of rotation of the hub may shift on account of thermal expansion and contraction. Over time, such shift results in eccentricity of the data tracks of the particular disk relative to the spindle center of rotation. In practical terms, such a shift may lead to lost data: i.e., data that was recorded when the disk was concentric that now cannot be recovered because of the shift which has resulted in runout or eccentricity.

One prior approach to compensate for disk slippage has been to subject newly assembled disk drives to thermal cycling at the end of the manufacturing/testing process. While this approach may tend to stabilize disk drives, it does not eliminate slippage, and it is time consuming and adds to the cost of manufacture of the completed disk drive.

One other approach has been to increase the clamping force by which the disk stack is clamped onto the flange of the spindle hub. Very large clamping forces have been used in an attempt to maintain the disks in proper position over extended operational/thermal cycles. A drawback of increased clamping force is that it tends to deform or warp the disks.

One other attempt to reduce slippage has been to oversize the central opening of the disks and space the disks away from the sidewall of the spindle hub, so that as the disks expand and contract radially, they do not come into contact with the outerwall surface of the hub.

None of these prior approaches has worked completely satisfactorily to solve the problem of disk slippage and movement incident to thermal cycling of the disk drive.

SUMMARY OF THE INVENTION WITH OBJECTS

A general object of the present invention is to provide a low cost method and apparatus for improved clamping of fixed disks within spindle assemblies in an manner which overcomes the limitations and drawbacks of the prior art.

A more specific object of the present invention is to provide a disk hub assembly which prevents disk slippage in rigid disk drives.

A further specific object of the present invention is to provide an improved disk spindle assembly which includes an in-the-hub spindle motor, and which also provides a simple, yet effective way to minimize disk slippage relative to the center of rotation of the spindle assembly.

One further specific object of the present invention is to fit an elastomeric spacer about a disk hub to enable concentric alignment of the disks relative to the spindle assembly to achieve superior axial clamping and yet permit the disks to expand toward the hub without becoming warped or otherwise binding against the outer wall of the hub as the disk drive heats up during operation.

Another specific object of the present invention is to provide very narrow annular mounting wall on the flange of a disk spindle hub, the wall thereby following expansion and contraction of the bottommost disk clamped thereto during thermal cycles.

Yet one more specific object of the present invention is to provide a spindle assembly with a hub flange having a very narrow annular mounting wall.

Yet another specific object of the present invention is to provide a concentric annular space between the hub which may be defined by somewhat resilient spacers for enabling the disk to expand and contract radially relative to the hub without slippage and warpage.

Still one more specific object of the present invention is to provide a disk stack and spindle assembly for a low cost, high capacity miniature disk drive which includes a powerful in-the-hub spindle motor, which provides effective motor flux shielding within the hub, and which further provides a mechanism to minimize axial and radial distortions and misalignments due to thermal cycles occuring within the disk drive during operations thereof.

In accordance with the present invention, a spindle assembly is provided to enable mounting of one or more rotatable rigid data storage disks relative to a base of a disk drive. The spindle assembly includes a vertically extending hub which is rotatably journalled to the base. The hub includes a flange extending radially outwardly from a lower region thereof. A hub flange defines a very narrow annular mounting wall which extends upwardly therefrom and engages the lower surface of the lowest disk of a disk stack along an annular contact band. The disk stack includes one or more disks and a clamp for applying a clamping force downwardly to the disk stack to cause it to bear against and be retained in position by the annular mounting wall.

In one aspect of the present invention, the disks define central openings which are slightly larger than the hub, and a concentric annular space, preferably defined by a spacer structure, is provided between the outer wall of the hub and the central opening of the one or more disks to provide room for radial expansion and contraction of the disks relative to the hub over thermal cycles.

In combination the concentric annular space and the annular mounting wall coact to promote and maintain concentricity between the disks and the spindle assembly and to minimize disk slippage and warpage relative to the hub.

These and other objects, aspects, advantages and features of the present invention will be more fully understood and appreciated upon consideration of the following detailed description of a preferred embodiment, presented in conjunction with the accompanying drawings.

DETAILED DESCRIPTION OF A PREFERRED EMBODIMENT

Figure 1:
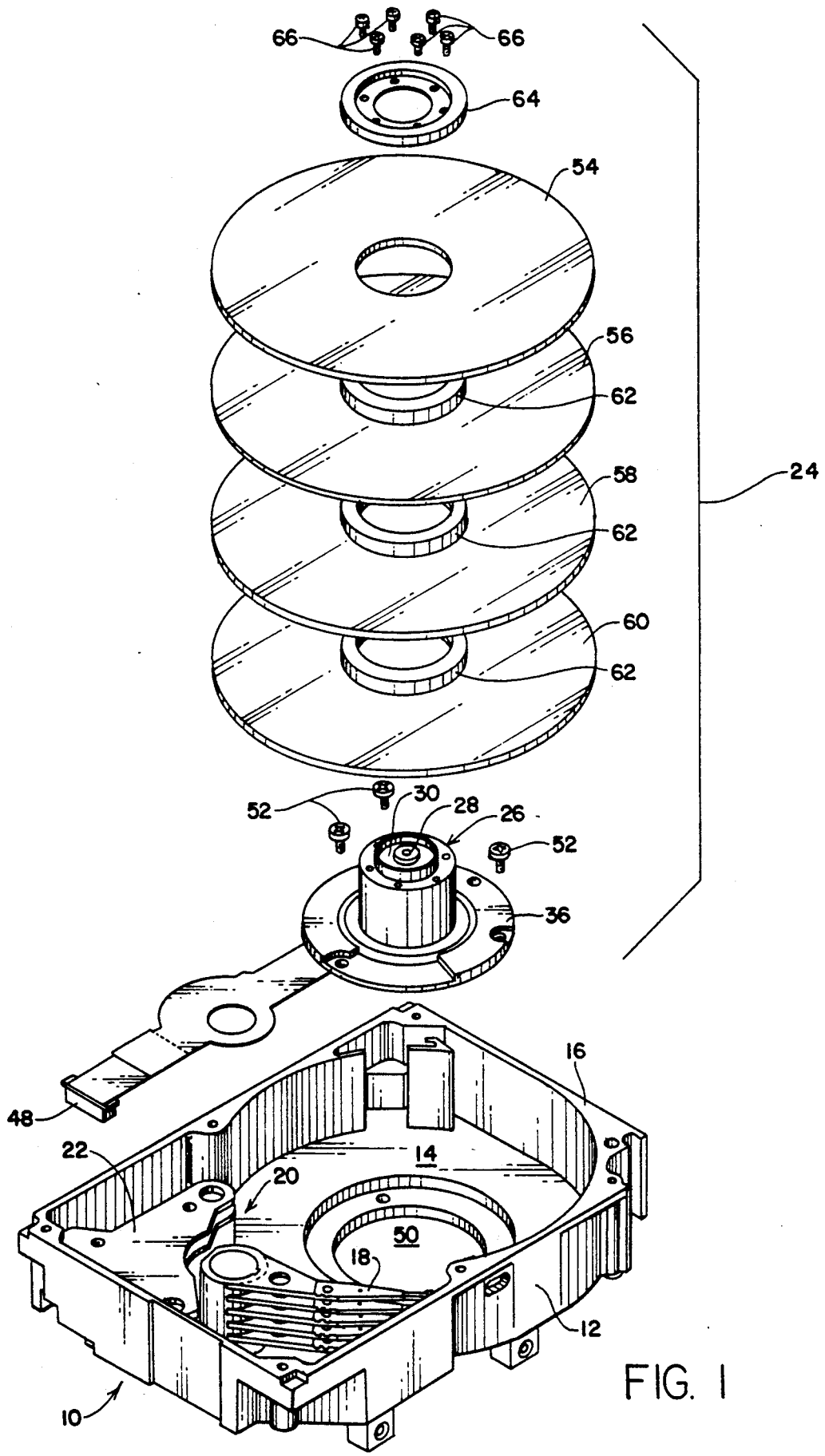
FIG. 1 is an exploded isometric view of a disk stack and spindle assembly of a high capacity micro-Winchester disk drive.
Figure 2:
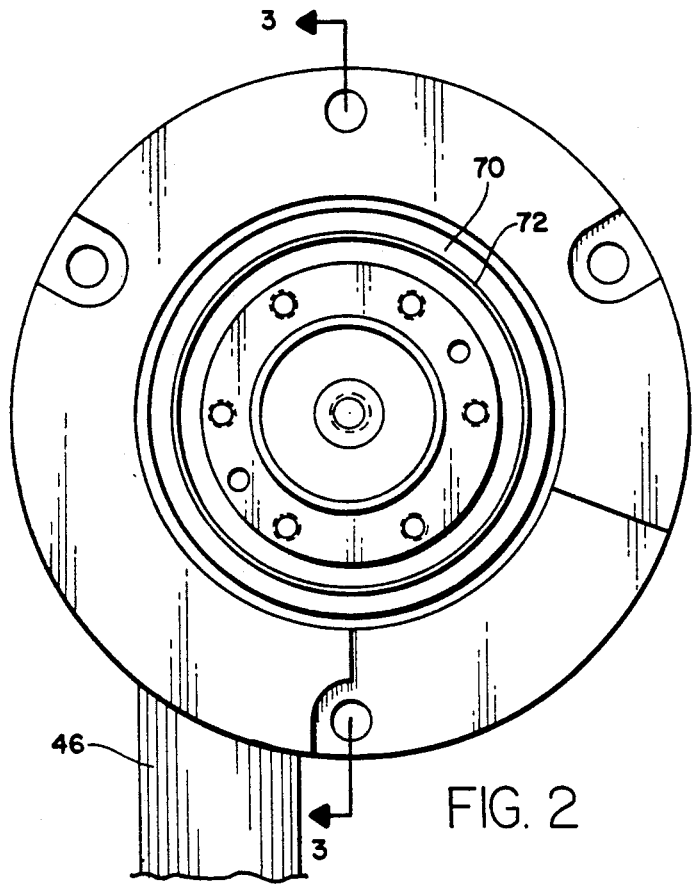
FIG. 2 is a top plan view of the FIG. 1 spindle assembly removed from the FIG. 1 base and with the disks, spacers and top clamp removed.

With reference to FIG. 1, a head and disk assembly 10 of a micro-Winchester disk drive data storage subsystem includes a base 12 which is typically formed of cast aluminum alloy. The base 12 defines an interior space 14 which is enclosed and sealed from the ambient environment by a top cover (not shown) which is affixed by screws to the top edge wall 16 of the base 12. A gasket (not shown) between the top cover and the top edge wall 16 facilitates the airtight seal. The sealed environment 14 excludes particulate and gaseous contaminants from the interior space 14.

A head stack 18 extends from a mass balanced rotary actuator assembly 20 which is rotatably journalled to the base 12 within the interior space 14. The rotary actuator includes a moving coil which moves in a magnetic gap defined between two high flux density permanent magnets, the top magnet being supported in place by a top flux return plate 22 formed of low carbon steel.

A spindle assembly 24 includes a spindle hub subassembly comprising a hub 26, a central shaft 28, ferrofluid seal 30, upper bearing 32, lower bearing 34 and mounting flange 36. Also included within a central region of the spindle hub assembly 26 is a direct drive, "Y" connected, three-phase dc brushless spindle motor comprising a fixed stator structure 38 and an annular permanent magnet 40 formed of a rare earth ferroceramic element, such as neodymium. The permanent magnet ring 40 is glued with an adhesive to an annular flux return ring 42 which is press-fit into the central opening of the hub 26. The three phase windings are wound around the fixed stator structure 38. A central longitudinal passage 44 through the shaft 28 enables connections to be made between a mylar conductor strip 46 and the windings. The conductor strip 46 carries multiple conductors and leads to a plug 48 which enables the windings to be connected to external motor drive circuitry (not shown).

Figure 3:
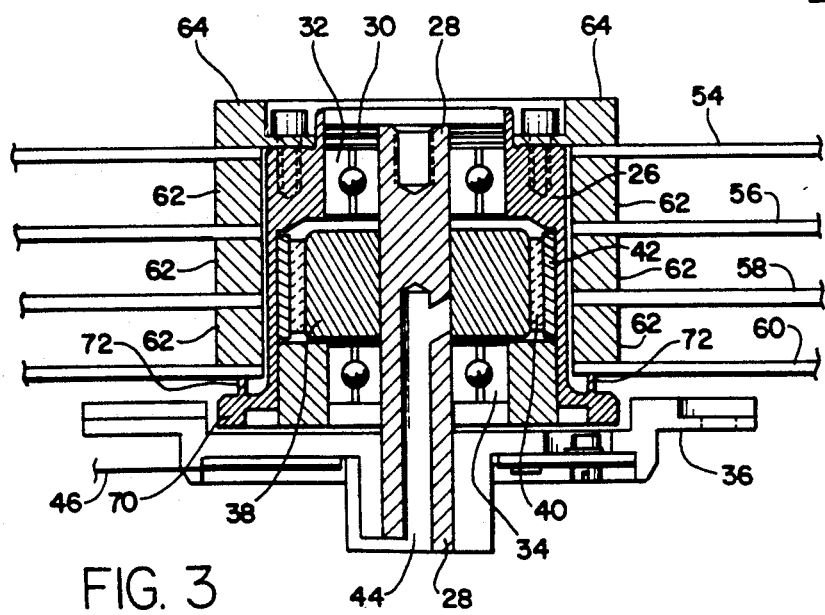
FIG. 3 is a side view in elevation and section of the FIG. 2 spindle assembly with the disks, spacers and top clamp shown installed.

The mounting flange 36 is mounted within a well 50 formed in the base 12 by three mounting screws 52, and the mounting flange 36 may carry suitable circuitry, such as Hall effect sensors, enabling commutation of the multiple phases of the brushless motor. Four data storage disks 54, 56, 58 and 60 define central openings which are slightly larger in diameter than the outside diameter of the hub 26, as shown in FIG. 3. Three spacers 62 fit between the disks and space them apart, so that there is room between two adjacent disks for two heads of the head stack 18 to be positioned and to operate in vertical alignment as the head stack 18 is moved from track to track during seeks and is maintained at a selected track during read/write operations by the rotary actuator structure 20. A disk clamp 64 clamps the disks 54–60 and spacers 62 over the hub 26. Six screws 66 enable the disk clamp 64 to be tightened to the top of the hub 26, as shown in FIG. 3.

Figure 4A:
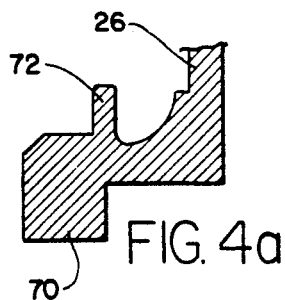
FIG. 4A is a greatly enlarged detail view of one preferred geometry of a portion of the radially extending lower flange of the FIG. 1 spindle assembly.
Figure 4B:
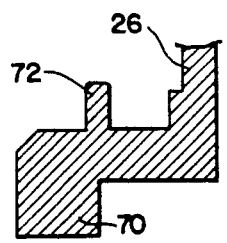
FIG. 4B is a greatly enlarged detail view of another preferred geometry of the same portion shown in FIG. 4A.

As seen in FIG. 3, a flange 70 extends radially outwardly from a lower region of the hub 26 below the lowermost disk 60. This outwardly extending flange 70 defines a very narrow annular support wall 72. The support wall 72 is continuous about the flange 70 and is typically formed by turning the hub 26 on a lathe during a finishing operation of the hub manufacturing process. FIG. 4A illustrates one preferred geometry for the flange 70 and support wall 72; and, FIG. 4B illustrates another equally preferred geometry.

In practice, the support wall 72 extends approximately 1.22 millimeters in height above the upper face of the flange 70. At its upper face which contacts the lower surface of the disk 60, the wall is approximately one half millimeter wide. The inside diameter of the support wall is approximately 28.5 millimeters, as the disks 54–60 are so-called "micro-Winchester" disks, having a nominal diameter of approximately 95 millimeters. The overall height of the FIG. 3 spindle assembly is approximately 36.5 millimeters.

Figure 5:
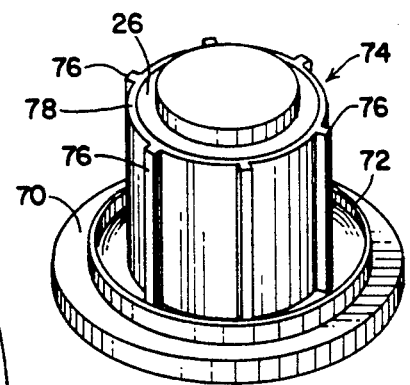
FIG. 5 is an isometric view of the spindle hub showing the elastomeric spacer thereon.

In accordance with one aspect of the present invention, a spacer structure 74 is disposed between the hub 26 and the disks 54–60 and spacers 62. The spacer structure 74, FIG. 5, preferably comprises a series of slender vertical fingers 76, such as six fingers, which are spaced about the periphery of the hub 26. A bridging portion 78 of the structure 74 connects the fingers together and enables fabrication of a unitary spacer structure. In practice, the six fingers are diametrally disposed in pairs, so that a finger on one side of the hub is diametrally aligned with a finger on the other side of the hub. Preferably, the fingers 76 are about 2–3 mils thick and are comprised of suitable elastomeric film material, such as Mylar film. The Mylar film carries a flexible adhesive film coated on the underside thereof for direct adhesive contact with the hub 26. The coating is about 2 mils in thickness.

The adhesive-coated Mylar film fingers 76 are flexible and sufficiently compressible to accomodate the expansion and contraction of the disks 54–60 relative to the hub 26 during thermal cycles without disk slippage, and without the disks becoming bound up against the hub and consequent warpage and loss of flatness and concentricity.

In operation, the disk clamp 64 is affixed to the top region of the hub 26 by the screws 66 and applies a modest clamping force, such as 80 to 100 lbs. to the disk stack of disks 54–60 and spacers 62. This modest clamping force is sufficient to retain the disk stack within nominal clamping concentricity relative to the axis of rotation of the hub 26 and without causing any warpage or surface deformation of the data surfaces of the disks. As the assembly 10 passes through a thermal cycle, the annular wall structure 72 is free to bend radially outwardly and radially inwardly, and it thereby "floats" the disk stack relative to the hub 26 without resulting in disk slippage.

Figure 6:
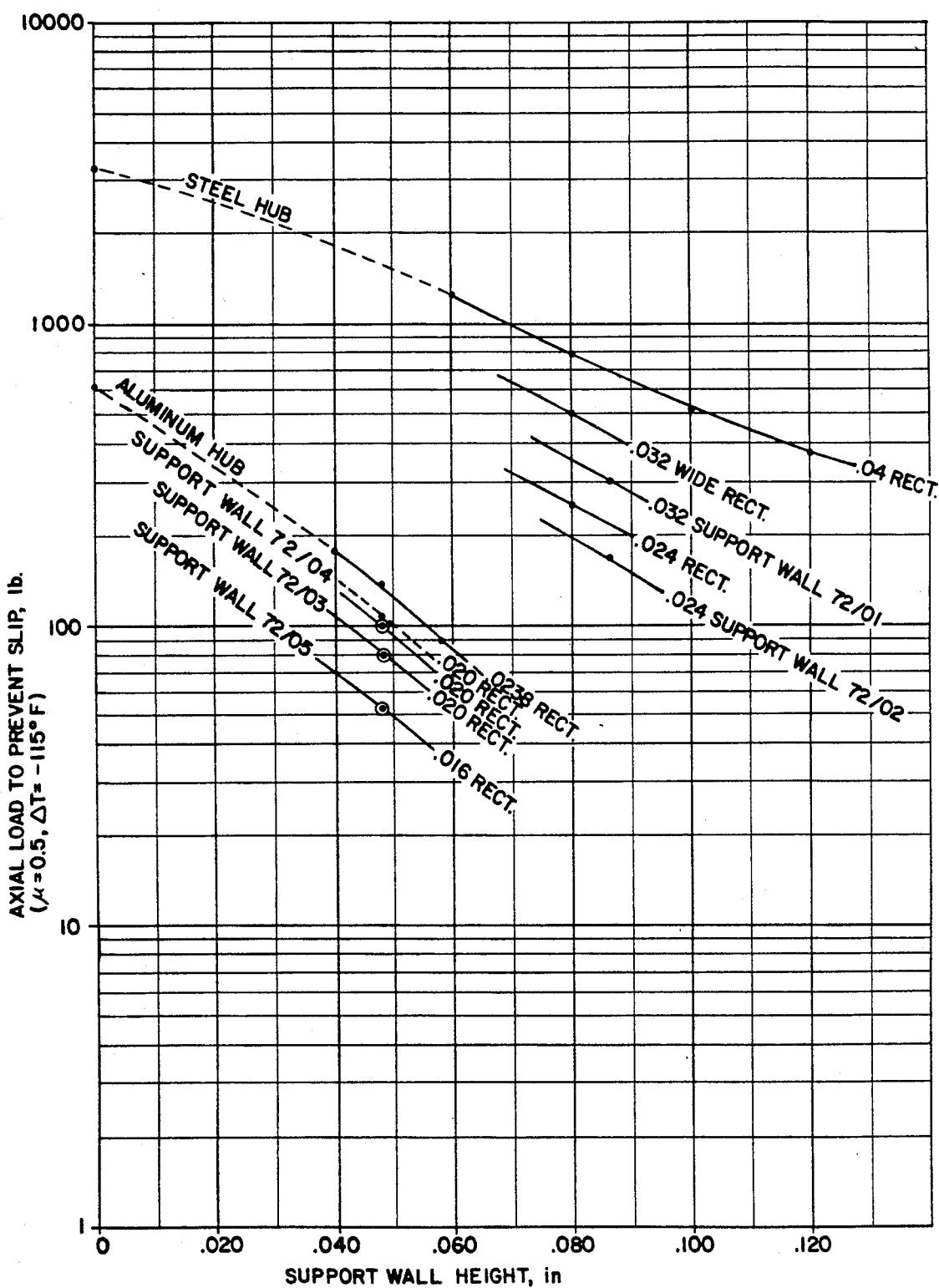
FIG. 6 is a graph of clamping force versus height of the annular support wall extending upwardly from the lower flange of the spindle hub, with values given for various thicknesses of the support wall for both aluminum and steel hubs for micro-Winchester sized disks.

FIG. 6 provides a graph of height versus clamping force to prevent slippage for wall structures 72 of varying thicknesses for both aluminum and steel hubs 26.

Although the presently preferred embodiment of the invention has been illustrated and discussed herein, it is contemplated that various changes and modifications will be immediately apparent to those skilled in the art after reading the foregoing description in conjunction with the drawings. For example, stainless steel or cast aluminum may be used for disk hub assembly 24. Other deformable and flexible materials may be used for the spacer structure 74. The entire hub 26 may be covered with spacer material formed as a continuous cylinder or sheet. The hub assembly 24 may be used with or without an in-the-hub spindle motor. Accordingly, it is intended that the description herein is by way of illustration and should not be deemed limiting the invention, the scope of which being more particularly specified and pointed out by the following claims.

I claim:

1. In a disk spindle assembly of a fixed disk drive, the spindle assembly for mounting a stack of data storage disks for rotation relative to a base and including a rotatable hub, the improvement comprising:

each of the disks of the stack defining a central opening slightly larger than a diameter dimension in cross-section of the hub, so that the stack may freely fit over the hub, thereby to define a concentric annular space between the inside wall of each disk of the stack and an oppositely facing surface of the hub, spacer means between adjacent ones of the said disks for spacing the said disks of the stack apart along an axial dimension of the rotatable hub, a continuous flange extending radially outwardly from a lower region of the hub, the flange including a thin, continuous, substantially annular support wall means projecting from the flange in an axially upward direction along the hub, the support wall means for supporting a lowermost one of the said disks of the stack along a narrow, substantially annular and continuous contact region between the hub and the said lowermost disk, the support wall means for bending radially inwardly and outwardly relative to the hub thereby to permit radial expansion and contraction of each disk of the stack at the central opening thereof during thermal cycles, and clamping means for clamping the disk stack in axial alignment with the hub in compression against the support wall means.

2. The improved disk spindle assembly set forth in claim 1 further comprising elastomeric spacer means for aligning the disk stack relative to an axis of rotation of the hub and for spacing each disk away from the hub, thereby to define the concentric annular space.

3. The improved disk spindle assembly set forth in claim 2 wherein the elastomeric spacer means comprises a series of vertical fingers which are spaced circumferentially about the outer surface of the hub.

4. The improved disk spindle assembly set forth in claim 1 further comprising brushless dc spindle motor means formed entirely inside of the hub.

5. The improved disk spindle assembly set forth in claim 4 wherein the motor means comprises permanent magnet means and magnetic flux return path providing means within the hub, the magnetic flux return path providing means comprised of a material having a different coefficient of thermal expansion than the material of which the hub is formed.

6. The improved disk spindle assembly set forth in claim 1 wherein the clamping means comprises a clamping member which is tightenable by screws to a top region of the rotatable hub.

* * * * *